(12) United States Patent
Kingsbury et al.

(10) Patent No.: US 8,474,065 B2
(45) Date of Patent: Jul. 2, 2013

(54) DEVICE AND METHOD FOR ADJUSTING FABRIC

(76) Inventors: Christina Heatherly Kingsbury, Hendersonville, TN (US); Nola Faye Heatherly, Ooltewah, TN (US)

(*) Notice: Subject to any disclaimer, the term of this patent is extended or adjusted under 35 U.S.C. 154(b) by 177 days.

(21) Appl. No.: 13/019,747

(22) Filed: Feb. 2, 2011

(65) Prior Publication Data

US 2011/0185542 A1 Aug. 4, 2011

Related U.S. Application Data

(60) Provisional application No. 61/337,378, filed on Feb. 3, 2010.

(51) Int. Cl.
*F16B 47/00* (2006.01)
*A44B 1/08* (2006.01)

(52) U.S. Cl.
USPC .................................. 2/221; 2/237; 24/304

(58) Field of Classification Search
USPC ........................ 24/304; 2/221, 237
See application file for complete search history.

(56) References Cited

U.S. PATENT DOCUMENTS

| | | | | |
|---|---|---|---|---|
| 1,174,976 A * | 3/1916 | Gaines | | 2/221 |
| 1,365,749 A * | 1/1921 | Torchia | | 2/76 |
| 1,649,690 A * | 11/1927 | Hatch | | 2/400 |
| 1,826,803 A * | 10/1931 | Lubell | | 2/237 |
| 2,393,392 A * | 1/1946 | Lyons | | 2/237 |
| 2,482,644 A * | 9/1949 | Wilker | | 2/237 |
| 3,793,645 A * | 2/1974 | Kadison | | 2/221 |
| 4,139,913 A * | 2/1979 | Garin et al. | | 2/237 |
| 4,580,298 A * | 4/1986 | Tuisl | | 2/237 |
| 4,596,055 A * | 6/1986 | Aach et al. | | 2/237 |
| 4,620,326 A * | 11/1986 | Matthias, Jr. | | 2/221 |
| 4,920,581 A * | 5/1990 | Gray | | 2/237 |
| 5,283,910 A * | 2/1994 | Flint | | 2/76 |
| 5,575,011 A * | 11/1996 | Allen | | 2/227 |
| 2007/0028364 A1* | 2/2007 | Oomae | | 2/237 |
| 2008/0086794 A1* | 4/2008 | Gardner, III | | 2/237 |
| 2008/0301855 A1* | 12/2008 | Ball | | 2/237 |

OTHER PUBLICATIONS

Photos—"Adjustable waist, so they'll fit just right.", at least as early as May 28, 2010, 1 pg.

* cited by examiner

*Primary Examiner* — Robert J Sandy
*Assistant Examiner* — David Upchurch
(74) *Attorney, Agent, or Firm* — Faegre Baker Daniels LLP

(57) ABSTRACT

An apparatus used in adjusting a garment or a piece of fabric and a method for implementing the same. The apparatus includes a bottom piece of fabric attached to a top piece of fabric and a piece of elastic sized to fit between the top and bottom pieces of fabric. The top piece of fabric includes two openings, one toward each end, through which the elastic piece fits. The elastic piece includes a plurality apertures sized to be able to receive buttons, which buttons are attached to the top and bottom pieces of fabric and buttoned through a corresponding aperture in the elastic piece.

8 Claims, 10 Drawing Sheets

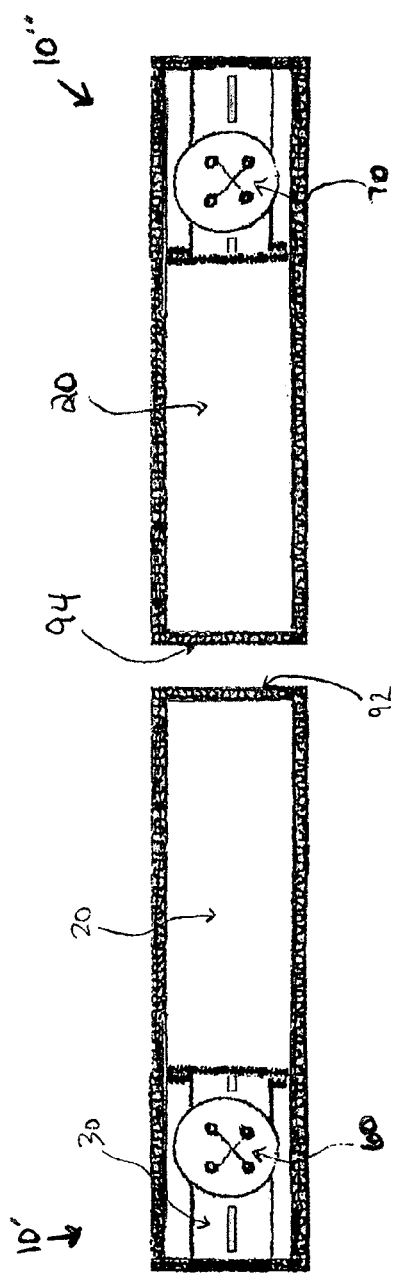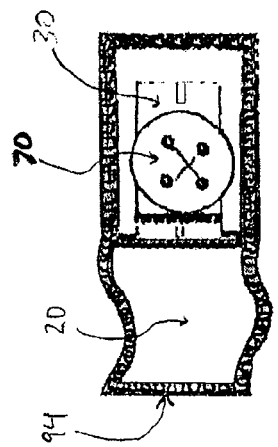
FIG. 7C
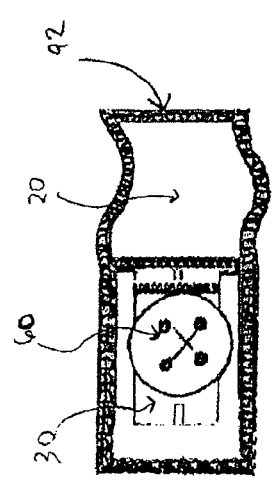
FIG. 7D

DEVICE AND METHOD FOR ADJUSTING FABRIC

The present disclosure claims priority from U.S. provisional application No. 61/337,378, filed Feb. 3, 2010, the disclosure of which is expressly incorporated herein by reference.

FIELD OF THE DISCLOSURE

The present disclosure relates to a device used in the adjustment of garments or fabric. More particularly, the present disclosure relates to an adjustment device that is attached to a garment or piece of fabric.

BACKGROUND AND SUMMARY OF THE DISCLOSURE

People often need to adjust a garment or any other piece of fabric. For example, a person may need to adjust a pair of jeans, a shirt, or even a curtain. However, by their very nature, most garments or pieces of fabric simply cannot be adjusted without cutting the fabric (e.g., having it altered by a professional). Thus, the person is left with multiple undesirable options: (1) paying to have the garment or fabric altered; (2) buying a different garment or piece of fabric; or (3) doing nothing.

Accordingly, implementation of the fabric adjustment device of the present disclosure is a novel and unique way to simplify the process of adjusting a garment or any other piece of fabric.

In an exemplary embodiment, the fabric adjustment device of the present disclosure includes a first piece of fabric and a second piece of fabric attached to the first piece of fabric. The second piece of fabric has a first end with a first opening and a second end with a second opening. The device of the present disclosure also includes an elastic piece sized to fit between the first and second pieces of fabric and through the first and second openings in the second piece of fabric. The elastic piece also includes a plurality of apertures, the apertures being able to engage first and second buttons which are attached to the respective ends of the first and second pieces of fabric.

In an exemplary method of implementing the device of the present disclosure, the fabric adjustment device as previously described, including the first and second buttons buttoned into a first and third aperture of elastic piece, respectively, is affixed to a desired piece of fabric. Once the device is affixed to the desired piece of fabric, the first button is unbuttoned from a first aperture and the elastic piece is pulled a desired distance away from the second button, which is buttoned into the third aperture. The first button is then buttoned into a second aperture in the elastic piece. Optionally, the second button may be unbuttoned from the third aperture, the elastic piece pulled in a direction away from the first button, and the second button then buttoned into a fourth aperture in elastic piece.

In yet another exemplary method of implementing the device of the present disclosure, the fabric adjustment device as previously described, including the first and second buttons buttoned into a first and third aperture of elastic piece, respectively, is affixed to a desired piece of fabric. Once the device is affixed to the desired piece of fabric, the first button is unbuttoned from a first aperture and the elastic piece is pulled a desired distance away from the second button, which is buttoned into the third aperture. The first button is then buttoned into a second aperture in the elastic piece such that a first excess piece of elastic piece exists, the excess piece having at least one aperture. The first excess elastic piece is then doubled-back and buttoned to the first button via the at least one aperture. Optionally, the second button may be unbuttoned from the third aperture, pulled in a direction away from the first button, and then buttoned into a fourth aperture in elastic piece such that a second excess piece of elastic piece exists, the second excess piece having at least one aperture. The second excess elastic piece is then doubled-back and buttoned into the second button via the at least one aperture.

BRIEF DESCRIPTION OF THE DRAWINGS

The above mentioned and other features of this disclosure, and the manner of attaining them, will become more apparent and the disclosure itself will be better understood by reference to the following description of embodiments taken in conjunction with the accompanying drawings, wherein:

FIG. 7C illustrates another top view of the device of FIG. 7A;

FIG. 7D illustrates a top view of the device of FIG. 7C in a second orientation;

Corresponding reference characters indicate corresponding parts throughout the several views.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

Figure 1:
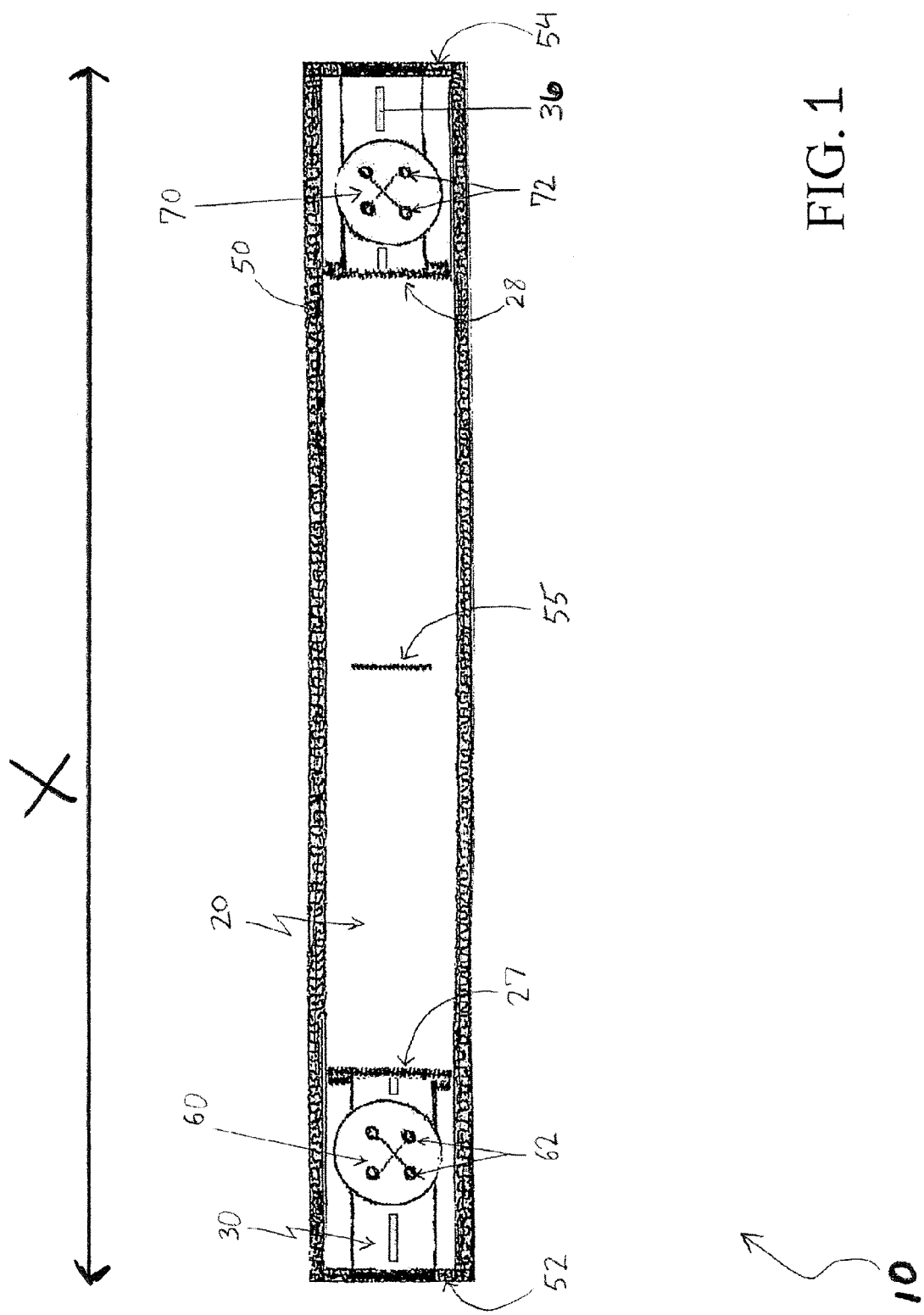
FIG. 1 illustrates a top view of an exemplary fabric adjustment device in a first orientation.

Referring to FIG. 1, an exemplary fabric adjustment device 10 of the present disclosure is illustrated. Fabric adjustment device 10 includes top piece 20 attached to bottom piece 40, and elastic piece 30, which fits between top piece 20 and bottom piece 40 and through openings 27 and 28 in top piece 20.

Figure 2:
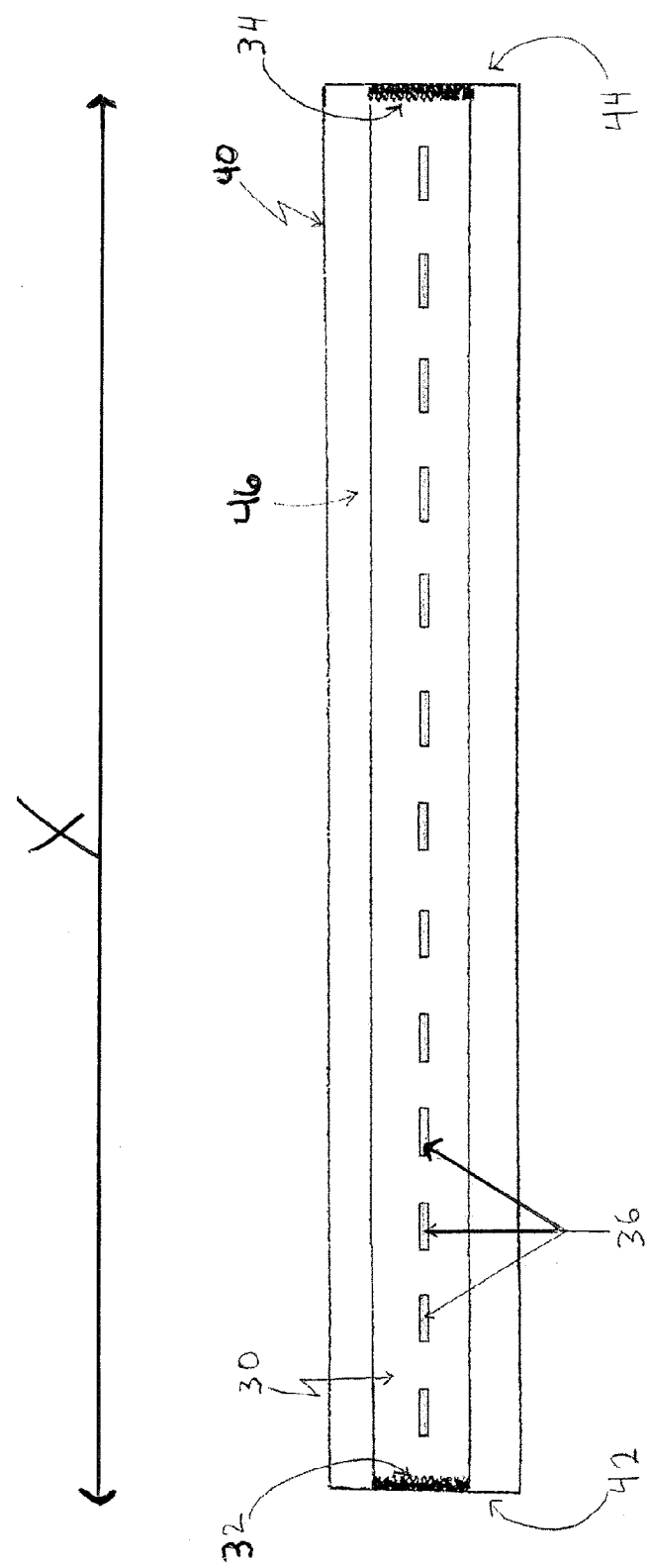
FIG. 2 illustrates a top view of a bottom piece and an elastic piece of the fabric adjustment device of FIG. 1.

Bottom piece 40 is best illustrated in FIG. 2. Bottom piece 40 includes first end 42 and second end 44. Bottom piece 40 may be any type of clothing or textile material, including, for example, cotton, nylon, denim, or any other material. Bottom piece 40 also includes top side 46 and a bottom side (not shown). In this exemplary embodiment, elastic piece 30 sits on top side 46 of bottom piece 40 and is not attached to bottom piece 40 until after top piece 20 is attached to bottom piece 40 (as best depicted in FIG. 1, described below). In an exemplary embodiment, the bottom side of bottom piece 40 includes an adhesive substance (not shown), such as, for example, heat activated glue. Such adhesive substance may be used to affix fabric adjustment device 10 to any desired material or fabric by ironing or otherwise. Alternatively, the adhesive may be used simply to aid one in affixing device 10 to a desired material or fabric, as device 10 may be sewn directly onto a desired material or fabric.

Referring still to FIG. 2, elastic piece 30 includes first end 32 and second end 34. Elastic piece 30 also includes a plurality of apertures 36 evenly spaced apart from one another. In this exemplary embodiment, elastic piece 30 is the same length X as bottom piece 40, and during the initial configuration of exemplary device 10, elastic piece 30 rests on top of bottom piece 40. It should be understood that length X and the configurations depicted in FIGS. 1-4 do not limit how the fabric adjustment device of the present disclosure may be implemented. That is, for example, fabric adjustment device 10 may be implemented horizontally, vertically, or at any angle on any material or piece of fabric.

Figure 3:
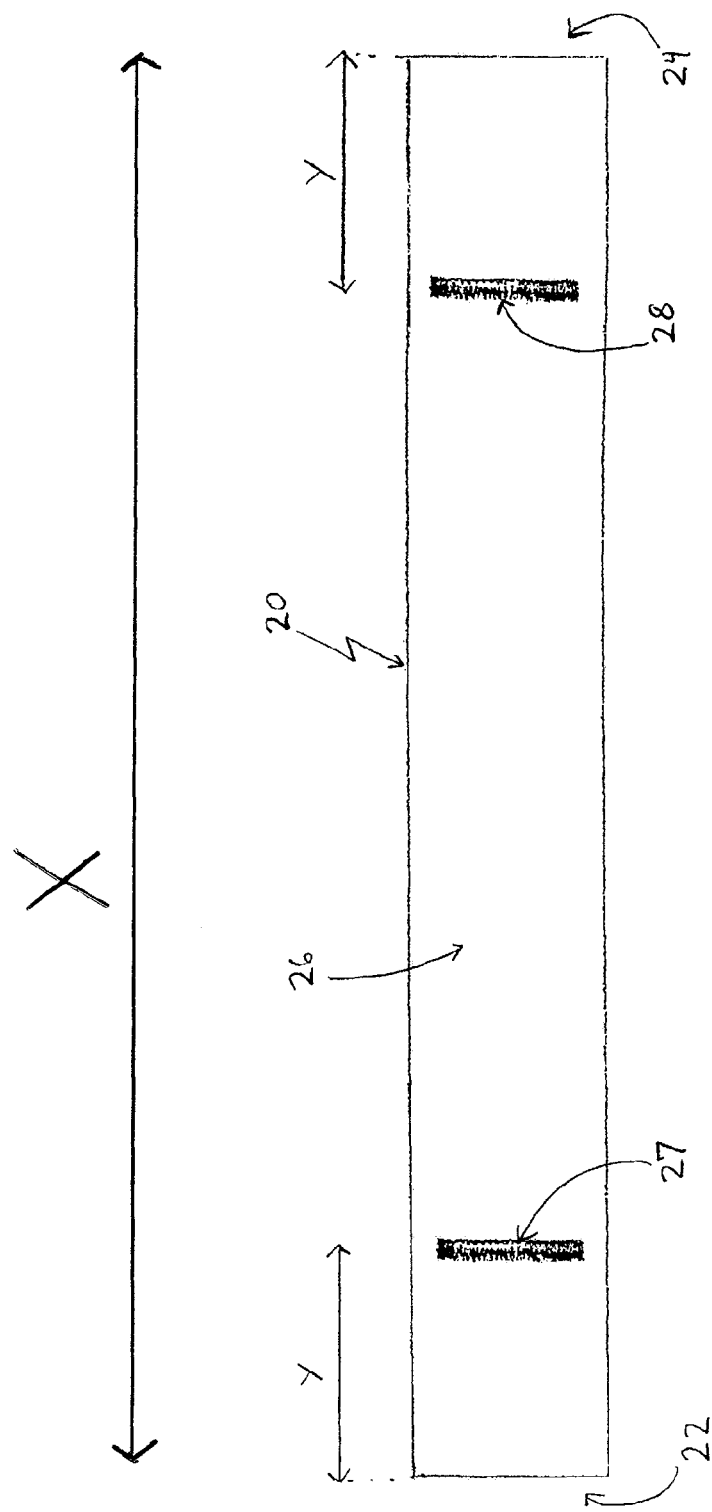
FIG. 3 illustrates a top view of a top piece of the fabric adjustment device of FIG. 1.

Fabric adjustment device 10 also includes top piece 20, as illustrated in FIG. 3. Top piece 20 includes first end 22 and second end 24. In an exemplary embodiment, top piece 20 is the same length X as bottom piece 40 and elastic piece 30. In this embodiment, top piece 20 is also the same height (or width) as bottom piece 40, and thus is the same dimensions as bottom piece 40. Also like bottom piece 40, top piece 20 may be any type of clothing or textile material. In an exemplary embodiment, top piece 20 is the same material as bottom piece 40. However, top piece 20 may also be a different material or fabric. Additionally, top piece 20 includes top side 26 and a bottom side (not shown). In an exemplary embodiment, the bottom side of top piece 20 includes an adhesive substance (also not shown) that assists in the attachment of top piece 20 to bottom piece 40, as discussed in more detail below. Top piece 20 also includes openings 27 and 28. Openings 27 and 28 are located toward each end 22 and 24, respectively, of top piece 20. Openings 27 and 28 are sized such that they are capable of receiving elastic piece 30 therethrough. In an exemplary embodiment, openings 27 and 28 are equally spaced from the first end 32 and second end 34, as depicted by distance Y.

Referring again to FIG. 1, top piece 20 is attached to bottom piece 40. Elastic piece 30 is positioned between bottom piece 40 and top piece 20, and through openings 27 and 28 in top piece 20. Attached top piece 20 and bottom piece 40 include first edge 52 and second edge 54. Because elastic piece 30, bottom piece 40, and top piece 20 are the same length X, elastic piece 30 extends from edge 52 to edge 54. In an exemplary embodiment, bottom side of top piece 20 (not shown) includes an adhesive substance, e.g., heat activated glue. The adhesive substance aids in the process of attaching top piece 20 to bottom piece 40. In another exemplary embodiment, top piece 20 and bottom piece 40 are sewn together via stitching 50. In yet another embodiment, both stitching 50 and an adhesive substance (not shown) may be used to attach bottom piece 40 and top piece 20. Additionally, in another exemplary embodiment, tacking stitch 55 may be inserted. Tacking stitch 55 attaches top piece 20, bottom piece 40, and elastic piece 30. Alternatively, elastic piece 30 may be tacked to bottom piece 40 prior to the addition of top piece 20.

Buttons 60 and 70 are attached to the fabric adjustment device 10. Buttons 60 and 70 each include a plurality of apertures 62 and 72, respectively, which are used to sew buttons 60 and 70 to both bottom piece 40 and top piece 20. Buttons 60, 70 are positioned between edges 52, 54 and openings 27, 28, and are horizontally centered with apertures 36 at each end 32, 34 of elastic piece 30. Once buttons 60, 70 are aligned, they are sewn into place and then buttoned through apertures 36 at each end of elastic piece 30. This positioning of buttons 60, 70 allows them to be buttoned through apertures 36, wherein the specific aperture 36 is chosen to achieve a desired level of stress or tension on elastic piece 30.

Figure 5:
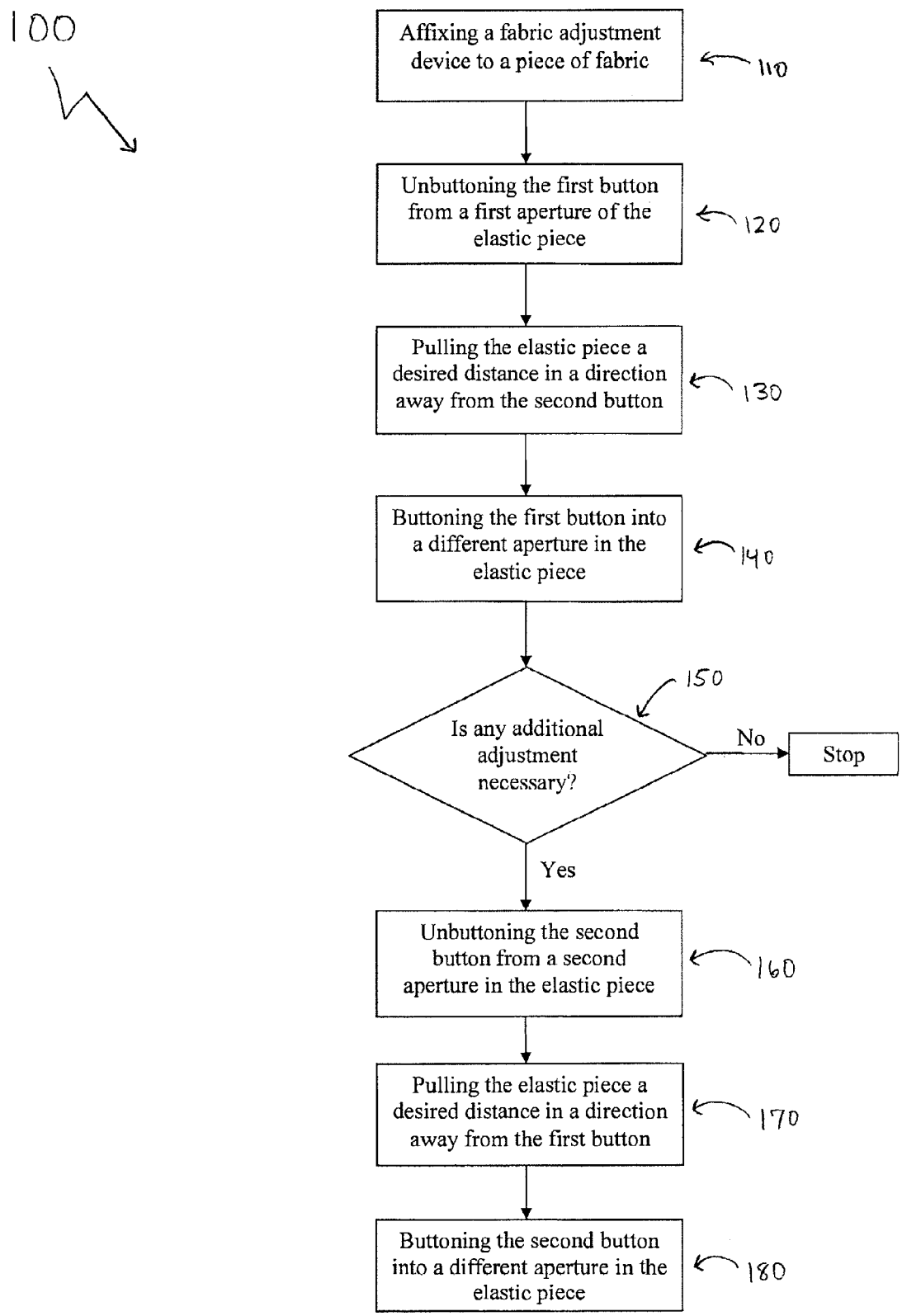
FIG. 5 illustrates a flow chart for a method of use for the fabric adjustment device of FIG. 1.

An exemplary method 100 of implementing an exemplary fabric adjustment device of the present disclosure is provided by the flowchart in FIG. 5. An exemplary fabric adjustment device 10 of the present disclosure, once assembled, is affixed to a piece of fabric, box 110. Once the fabric adjustment device 10 is affixed to a piece of fabric, the operator unbuttons first button 60 from elastic piece 30, box 120. The operator then pulls elastic piece 30 a desired distance in a direction away from center (i.e., in a direction away from second button 70), box 130. Once the desired distance has been reached, the operator buttons first button 60 into a different aperture 36 in elastic piece 30, box 140.

The exemplary fabric adjustment device 10 has been shortened as a result of the operator performing these initial steps 110, 120, 130, and 140. Because fabric adjustment device 10 is attached to a desired piece of fabric, the desired piece of fabric also has been shortened. As a result, the operator decides whether additional adjustments to the desired fabric are necessary, box 150. If additional adjustments are necessary, the operator proceeds to the next step by unbuttoning second button 70 from elastic piece 30, box 160. The operator then pulls elastic piece 30 a desired distance in a direction away from center (i.e., away from button 60), box 170. Once the desired distance has been reached, the operator buttons second button 70 into a different aperture 36 in elastic piece 30, box 180. It should be understood that the foregoing description of exemplary method 100 is exemplary only. Thus, for example, an operator may choose to start with second button 70 (box 160) instead of first button 60. Or, alternatively, an operator may choose to readjust first button 60 by repeating the steps in boxes 120 through 140 instead of proceeding to the steps disclosed in boxes 160 through 180.

Figure 6:
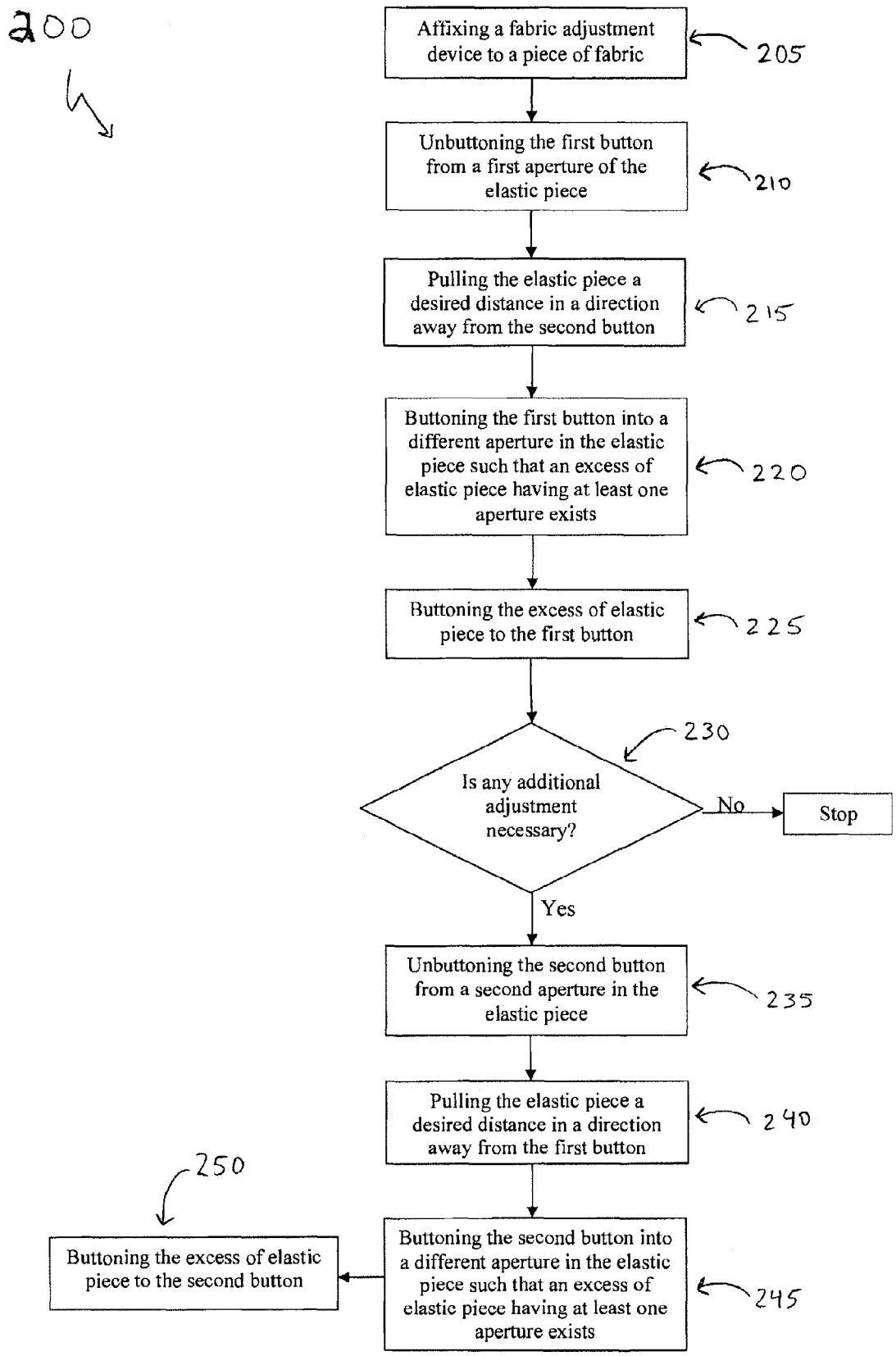
FIG. 6 illustrates a flow chart for another method of use for the fabric adjustment device of FIG. 1.

Another exemplary method 200 is illustrated by the flow chart in FIG. 6. Exemplary method 200 is similar to exemplary method 100 except for a few additional steps, i.e., the steps in boxes 220, 225, 245, and 250. Specifically, an exemplary fabric adjustment device 10 is affixed to a desired piece of fabric, box 205. The operator then unbuttons first button 60 from elastic piece 30, box 210, and pulls elastic piece 30 a desired distance in a direction away from second button 70, box 215. The operator buttons first button 60 in a different aperture 36 such that first excess portion 80 of elastic piece 30 exists, this first excess portion 80 having at least one free aperture 36, box 220. First excess portion 80 of elastic piece 30 is then doubled back and buttoned to first button 60, box 225. In an exemplary embodiment, outermost aperture 36 is used to button first excess portion 80 of elastic piece 30 to first button 60; however, any aperture 36 in the first excess portion 80 of elastic piece 30 may suffice.

As with exemplary method 100, the operator next decides whether additional adjustments are necessary, box 230. If so, the operator proceeds by unbuttoning second button 70 from elastic piece 30, box 235. The operator then pulls elastic piece 30 a desired distance in a direction away from first button 60, box 240. The operator buttons second button 70 in a different aperture 36 such that second excess portion 90 of elastic piece 30 exists, second excess portion 90 having at least one free aperture 36, box 245. Second excess portion 90 of elastic piece 30 is then doubled back and buttoned to second 70, box 250. In an exemplary embodiment, outermost aperture 36 of second excess portion 90 of elastic piece 30 is used to button elastic piece 30 to second button 70; however, any aperture in second excess portion 90 of elastic piece 30 may suffice. As with exemplary method 100, it should be understood that the foregoing description of exemplary method 200 is exemplary only. Thus, for example, an operator may choose to start with second button 70 (box 235) instead of first button 60. Or, alternatively, an operator may choose to readjust first button 60 by repeating the steps in boxes 210 through 225 instead of proceeding to the steps in boxes 235 through 250.

Figure 4A:
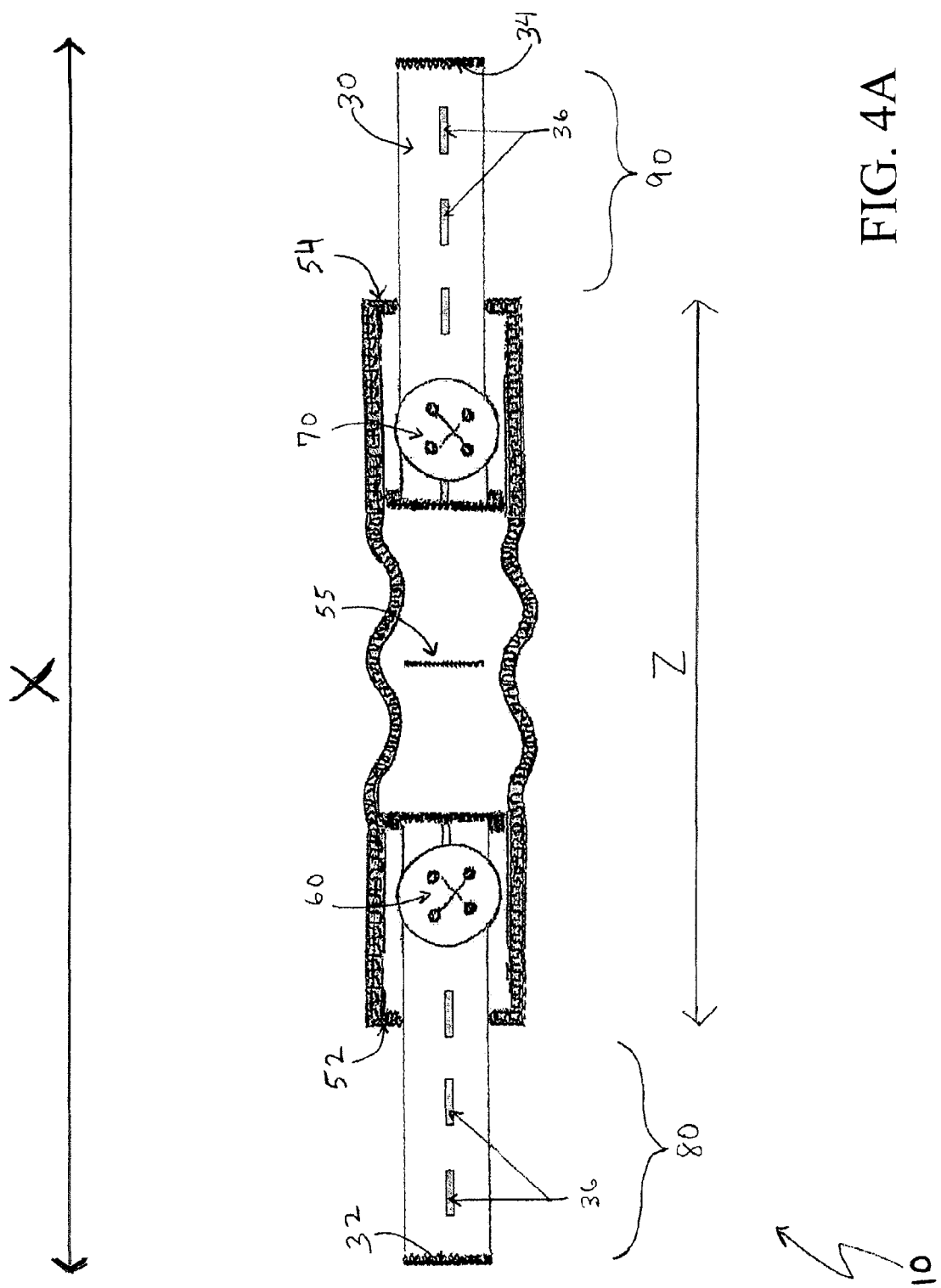
FIG. 4A illustrates a top view of the fabric adjustment device of FIG. 1 in a second orientation.
Figure 4B:
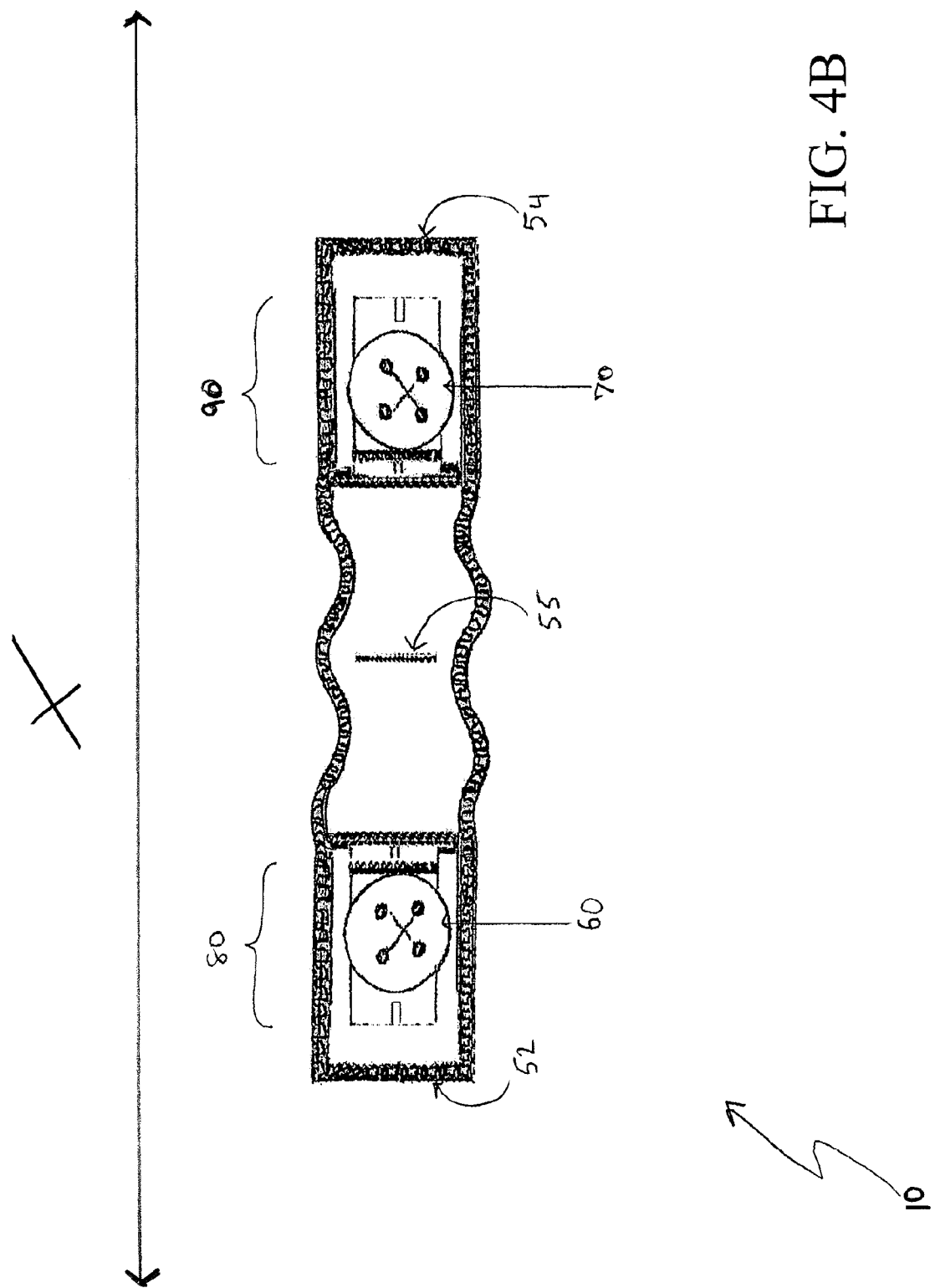
FIG. 4B also illustrates a top view of the fabric adjustment device of FIG. 1 in the second orientation.

While FIG. 1 illustrates an exemplary fabric adjustment device 10 in a first orientation, FIGS. 4A and 4B illustrate exemplary fabric adjustment device 10 in a second orientation after an operator has made adjustments using both buttons 60 and 70. FIGS. 4A and 4B illustrate exemplary embodiments only, as an operator may choose to adjust the device using only button 60 or only button 70 (or both, as depicted in FIGS. 4A and 4B). As described above for exemplary methods 100 and 200, adjustment of elastic piece 30 using buttons 60 and 70 causes the fabric portions of the device (i.e., bottom piece 40 and top piece 20, attached together) to shorten, or gather towards the center (i.e., towards tacking stitch 55). And because implementation of fabric adjustment device 10 requires device 10 to be attached to a desired piece of fabric, when device 10 is shortened, so too is the desired piece of fabric.

The difference in length of device 10 in the first orientation (e.g., FIG. 1) and device 10 in the second orientation after a user has adjusted elastic piece 30 (e.g., FIGS. 4A and 4B) is illustrated by the difference between length X and length Z. As described above, prior to any adjustments made by the operator (which occur after device 10 is implemented on a desired piece of fabric), elastic piece 30 is the same length (length X) as both top piece 20 and bottom piece 40. After adjustment, elastic piece 30 is at least length X; however, the fabric portions of the device (top piece 20 and bottom piece 40, attached together) gather towards the center of the device and therefore are shorter than their initial length, as illustrated by length Z. Additionally, depending on the adjustments made, elastic piece 30 may be longer than length X. For example, if elastic piece 30 is pulled away from center and buttons 60 and 70 are buttoned into apertures 36 closest to the center of the device 10, the force exerted on elastic piece 30 will cause it to be longer than original length X.

Referring still to FIG. 4A, in an exemplary embodiment, first excess portion 80 and second excess portion 90 of elastic piece 30 exist after the operator adjusts elastic piece 30 and re-buttons buttons 60 and 70, respectively. As shown in FIG. 4A, first excess portion 80 and second excess portion 90 are illustrated by ends 32 and 34 of elastic piece 30 extending past ends 52 and 54 of fabric adjustment device 10. Each excess portion 80, 90 of elastic piece 30 includes at least one aperture 36. As illustrated in FIG. 4B, in an exemplary embodiment, the user of device 10 may choose to double back both first excess portion 80 and second excess portion 90 of elastic piece 30 by folding each excess portion 80, 90 and buttoning each excess portion 80, 90 to a button 60, 70 through at least one aperture 36. Elastic piece 30 will be shorter than length X after either first excess portion 80 or second excess portion 90 (or both) is doubled-back.

Figure 7A:
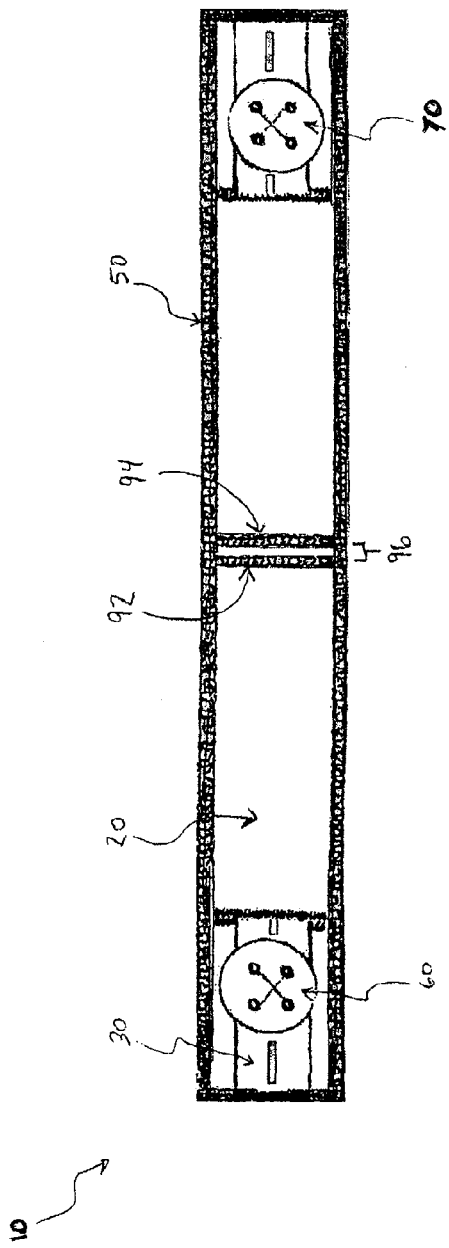
FIG. 7A illustrates a top view of another embodiment of an exemplary fabric adjustment device in a first orientation.
Figure 7B:
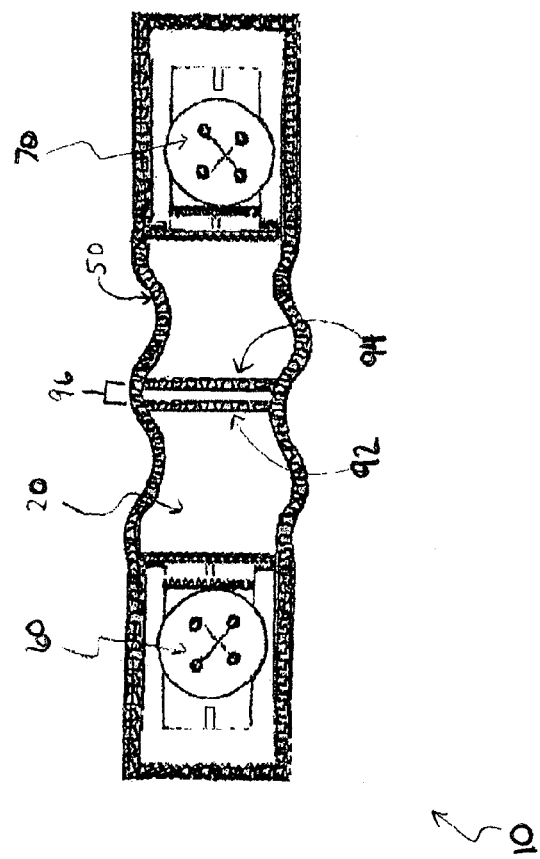
FIG. 7B illustrates a top view of the device of FIG. 7A in a second orientation.

Referring now to FIGS. 7A-7D, another embodiment of exemplary fabric adjustment device 10 is presented. In this embodiment, tacking stitch 55 is replaced with at least two seams 92 and 94 that define space 96. Seams 92 and 94 are created using stitching 50 or any known type of stitch available to one of ordinary skill in the art. In this embodiment, seams 92 and 94 are used to attach top piece 20, bottom piece 40, and elastic piece 30. In doing so, space 96 is created between seams 92 and 94. Notwithstanding use of seams 92 and 94 in lieu of tacking stitch 55, device 10 as depicted in this embodiment functions very similarly to device 10 as explained above with regard to FIGS. 4A-B. For instance, device 10 depicted in FIG. 7A defines a first orientation while FIG. 7B illustrates device 10 in a second orientation after an operator has made adjustments using both buttons 60 and 70. And as with FIGS. 4A-B above, FIGS. 7A and 7B illustrate exemplary embodiments only, as an operator may choose to adjust device 10 using only button 60 or only button 70. Additionally, as described above for exemplary methods 100 and 200, adjustment of elastic piece 30 using buttons 60 and 70 causes the fabric portions of the device (i.e., bottom piece 40 and top piece 20, attached together) to shorten, or gather towards the center; however, instead of gathering toward tacking stitch 55, device 10 of the present embodiment gathers toward seams 92 and 94.

Furthermore, device 10 of the present embodiment still functions similar to device 10 in the previous embodiment even when space 96 is cut. Space 96 is comprised of top piece 20, bottom piece 40, and elastic piece 30. As shown in FIG. 7A, space 96 is contiguous to seams 92 and 94. As depicted in FIG. 7A, space 96 is a pre-determined length that is wide enough to be cut by a cutting device (not shown) without disturbing either seam 92 or seam 94. A "cutting device" is any device that can be used to separate an object into at least two separate halves 10' and 10" such as scissors. Thus, for example, space 96 may be wide enough to enable an operator to cut space 96 using a pair of scissors, or space 96 may be wide enough to allow an operator to cut space 96 with a knife, any other single-bladed object (such as a razor blade), or any device capable of separating an object. Regardless of the cutting device used, when space 96 is cut, device 10 is separated into pieces 10' and 10", as shown in FIGS. 7C-D. Device 10 of this embodiment still operates as previously disclosed above with regard to FIGS. 4A-B and 7A-B; however, by cutting space 96, an operator can choose to implement either piece 10' or 10", or both. Accordingly, an operator has more freedom in deciding where to place the fabric adjustment device of the present disclosure (i.e., in two locations on a piece of fabric, as opposed to one location). As such, an operator also has more freedom in how to adjust a piece of fabric. For instance, as depicted in FIG. 7D, piece 10' and 10" can be independently adjusted to a second orientation using buttons 60 and 70, respectively. Additionally, it should be appreciated that the device 10 can be attached whole, with a fabric fold being positioned to straddle space 96. In such an embodiment, cutting device 10 through space 96 after attachment allows unfolding of the fabric fold to regain previously pulled in length.

Figure 8A:
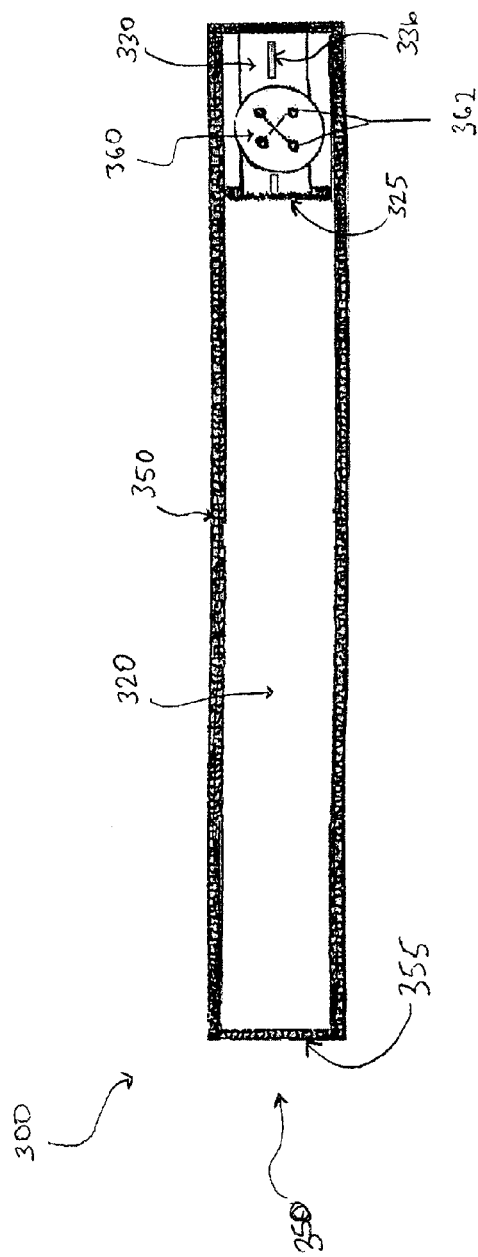
FIG. 8A illustrates a top view of a third embodiment of an exemplary fabric adjustment device in a first orientation.
Figure 8B:
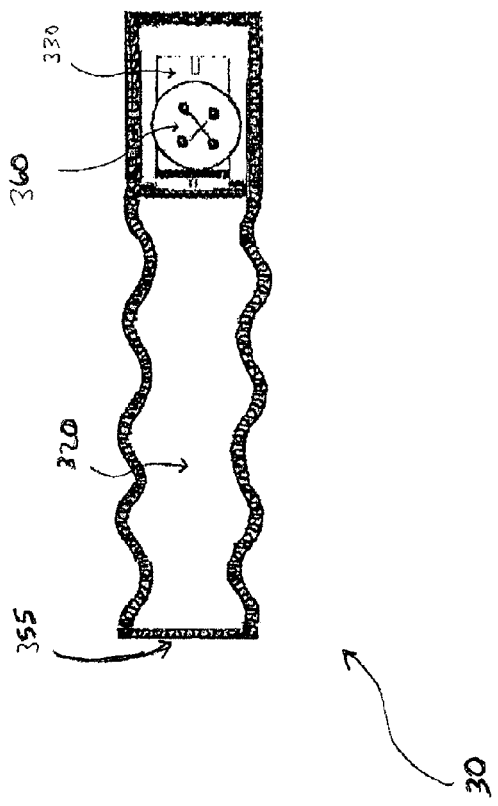
FIG. 8B illustrates the device of FIG. 8A in a second orientation.

Referring now to FIGS. 8A-B, yet another embodiment of an exemplary fabric adjustment device is presented. Device 300 functions identical to the embodiments disclosed above with reference to FIGS. 1-4; however, instead of using at least two buttons, device 300 uses only one button and a different means for fixing the elastic piece into place. Device 300 comprises top piece 320 attached via stitching 350 to bottom piece 340 (not shown), and elastic piece 330, which fits between top piece 320 and bottom piece 340 and through opening 325 in top piece 320. Device 300 uses only one button 360. Like the previous embodiments, elastic piece 330 includes a plurality of apertures 336 evenly spaced apart from one another, and is the same length as bottom piece 340. Also like the previous embodiments, button 360 includes a plurality of apertures 362 and is horizontally centered with apertures 336. Additionally, instead of elastic piece 330 being held in place by a tacking stitch, seam 355, located at first end 350, not only attaches top piece 320 and bottom piece 340, but also fixes elastic piece 330 such that when an operator adjusts the device of the present embodiment, seam 355 acts as an anchor for a first end (not shown) of elastic piece 330.

As previously mentioned, other than using only one button (and thus requiring a different means for anchoring elastic piece 330), device 300 of the present embodiment is configured and functions identical to the embodiment disclosed above with regard to FIGS. 1-4. Accordingly, device 300 is depicted in a first orientation (FIG. 8A) and a second orientation (FIG. 8B), the second orientation based on the operator adjusting elastic piece 330.

Finally, it should be understood that the methods disclosed above in FIGS. 5-6 may be used to implement the embodiments disclosed in FIGS. 7-8.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of adjusting fabric using a fabric adjustment apparatus, the method comprising the steps of:
    obtaining a desired piece of fabric;
    obtaining a fabric adjustment apparatus, the apparatus being separate from the fabric and being separately packaged upon being obtained;
    affixing the fabric adjustment apparatus to the desired piece of fabric, the fabric adjustment apparatus including:
        a first piece of fabric having a first end, a second end, a top side, and a bottom side,
        a second piece of fabric affixed to the first piece of fabric, the second piece of fabric including a first end, a second end, a first opening proximate the first end, and a second opening proximate the second end,
        an elastic piece having a plurality of apertures, the elastic piece at least partially located between the first piece of fabric and the second piece of fabric and extending through the first opening and the second opening,
        a first button attached at the first end of the first and second pieces of fabric, the first button being buttoned into a first aperture on the elastic piece, and
        a second button attached at the second end of the first and second pieces of fabric, the second button being buttoned into a third aperture on the elastic piece;
    unbuttoning the first button from the first aperture;
    pulling the elastic piece a desired distance in a direction away from the second button;
    buttoning the first button into a second aperture in the elastic piece, and
    cutting the fabric adjustment apparatus into two substantially similar pieces either before or after attachment to the fabric.

2. The method of claim 1, wherein the fabric adjustment apparatus has a first orientation whereby the first button is buttoned into the first aperture and the second button is buttoned into the third aperture.

3. The method of claim 1, wherein the fabric adjustment apparatus has a second orientation whereby the first button is buttoned into the second aperture and the second button is buttoned into the third aperture.

4. The method of claim 1 including the additional steps of:
    unbuttoning the second button from the second aperture in the elastic piece;
    pulling the elastic piece a desired distance in a direction away from the first button; and
    buttoning the second button into a fourth aperture in the elastic piece.

5. The method of claim 4, wherein the fabric adjustment apparatus has a third orientation whereby the first button is buttoned into the second aperture and the second button is buttoned into the fourth aperture.

6. The method of claim 1, wherein the bottom side of the first piece of fabric of the apparatus includes an adhesive substance and the fabric adjustment apparatus is attached to the desired piece of fabric by ironing the apparatus to activate the adhesive substance on the bottom side of the first piece of fabric of the apparatus.

7. A method of adjusting fabric using a fabric adjustment apparatus, the method comprising the steps of:
    obtaining a desired piece of fabric;
    obtaining a fabric adjustment apparatus, the apparatus being separate from the fabric and being separately packaged upon being obtained;
    affixing the fabric adjustment apparatus to the desired piece of fabric, the fabric adjustment apparatus including:
        a first piece of fabric having a first end, a second end, a top side, and a bottom side,
        a second piece of fabric affixed to the first piece of fabric, the second piece of fabric including a first end, a second end, a first opening proximate the first end, and a second opening proximate the second end,
        an elastic piece having a plurality of apertures, the elastic piece located between the first piece of fabric and the second piece of fabric and extending through the first opening and the second opening,
        a first button attached at the first end of the first and second pieces of fabric, the first button being buttoned into a first aperture on the elastic piece, and
        a second button attached at the second end of the first and second pieces of fabric, the second button being buttoned into a third aperture on the elastic piece;
    cutting the fabric adjustment apparatus into two substantially equal pieces;
    unbuttoning the first button from the first aperture;
    pulling the elastic piece a desired distance in a direction away from the second button;
    buttoning the first button into a second aperture in the elastic piece, creating a first excess of elastic piece having at least one aperture of the plurality of apertures therein; and
    buttoning the first excess of elastic piece to the first button via the at least one aperture of the first excess of elastic piece.

8. The method of claim 7, wherein the fabric adjustment apparatus has a first orientation whereby the first button is buttoned into the first aperture and the second button is buttoned into the third aperture, the fabric adjustment apparatus has a second orientation whereby the first button is buttoned into the second aperture and the second button is buttoned into the third aperture and further including the steps of:
    unbuttoning the second button from the third aperture in the elastic piece;
    pulling the elastic piece a desired distance in a direction away from the first button; and buttoning the second button into a fourth aperture in the elastic piece, creating a second excess of elastic piece having at least one aperture of the plurality of apertures therein; and buttoning the second excess of elastic piece to the second button via the at least one aperture of the plurality of apertures of the second excess of elastic piece, wherein the fabric adjustment apparatus has a third orientation whereby the first button is buttoned into the second aperture and the second button is buttoned into the fourth aperture, and wherein the fabric adjustment apparatus is attached to the desired piece of fabric by an adhesive substance on the bottom side of the first piece of fabric of the apparatus.

* * * * *